United States Patent [19]
Yamaguchi et al.

[11] Patent Number: 5,548,638
[45] Date of Patent: Aug. 20, 1996

[54] AUDIO TELECONFERENCING APPARATUS

[75] Inventors: Naoyuki Yamaguchi, Koganei; Tohru Abe, Hino, both of Japan

[73] Assignee: Iwatsu Electric Co., Ltd., Tokyo, Japan

[21] Appl. No.: 513,416

[22] Filed: Aug. 10, 1995

Related U.S. Application Data

[63] Continuation of Ser. No. 168,857, Dec. 16, 1993, abandoned.

[30] Foreign Application Priority Data

Dec. 21, 1992 [JP] Japan ................................ 4-355443
Dec. 24, 1992 [JP] Japan ................................ 4-357341
Dec. 24, 1992 [JP] Japan ................................ 4-357342

[51] Int. Cl.$^6$ ................................................ H04M 3/56
[52] U.S. Cl. ................ 379/202; 379/347; 379/409; 379/410; 379/399; 379/389; 379/390
[58] Field of Search ................................ 379/202, 201, 379/347, 409, 410, 204, 205, 411, 406, 399, 390, 389, 386; 370/60, 62

[56] References Cited

U.S. PATENT DOCUMENTS

| | | | |
|---|---|---|---|
| 4,165,449 | 8/1979 | Vachon | 379/409 |
| 4,645,883 | 2/1987 | Horna et al. | 379/406 |
| 4,741,025 | 4/1988 | Muruyama et al. | 379/202 |
| 4,894,820 | 1/1990 | Miyamoto et al. | 379/410 |
| 4,991,167 | 9/1991 | Petri et al. | 379/410 |
| 5,157,653 | 10/1992 | Genter | 379/410 |
| 5,237,562 | 8/1993 | Fujii et al. | 379/410 |
| 5,263,020 | 11/1993 | Yatsuzuka et al. | 379/410 |
| 5,274,705 | 12/1993 | Younce et al. | 379/410 |
| 5,343,521 | 8/1994 | Jullien et al. | 379/409 |
| 5,410,595 | 4/1995 | Park et al. | 379/202 |

*Primary Examiner*—Jeffery Hofsass
*Assistant Examiner*—Scott Wolinsky
*Attorney, Agent, or Firm*—Emmanuel J. Lobato

[57] ABSTRACT

An audio teleconferencing apparatus which permits two-way communications between more than two parties without the necessity of complete switching and does not allow a loss to increase in a communication channel of a particular speaker. The audio teleconferencing apparatus further comprises more than two line interface circuits, each provided with a voice activity detector for detecting voice activity in a received speech signal, a received-speech variable loss for inserting a loss into a speech receiving path when the received speech signal is voice non-active, and a sending-speech variable loss for inserting a loss in a speech signal transmission or sending path when the speech to be sent is voice-active, whereby a certain loss is inserted in any four-wire multiplex loop in the line interface circuit.

9 Claims, 7 Drawing Sheets

AUDIO TELECONFERENCING APPARATUS

This is a continuation, of Application Ser. No. 08/168,857, filed Dec. 16, 1993, now abandoned.

BACKGROUND OF THE INVENTION

The present invention relates to an audio teleconferencing apparatus which allows an audio conference to be held through the use of two-wire circuits such as telephone lines.

An audio teleconferencing apparatus has advantages, as a means for teleconferencing among a plurality of distantly located parties. Such advantages include instantaneous and convenient operations without the necessity of any traveling expenses so that several parties may confer among themselves. It offers, for example, a so-called "chattering square" or "party line" through which an unspecified number of speakers can enjoy easy talking among themselves. Hence, there is currently a strong and growing demand for the audio teleconferencing services provided by such apparatuses.

The audio teleconferencing, apparatus usually employs a public telephone network (a two-wire circuit) and is always connected to the telephone line, and teleconferencing can be started by making a telephone call to the audio teleconferencing apparatus. During teleconferencing speaker's voices pass through the telephone line twice and are reduced in volume accordingly; hence, the audio teleconferencing apparatus needs to be equipped with an amplifying function for compensating for the reduced speech volume and amplifies and adds the voices through a two-wire/four-wire conversion. At this time, a plurality of four-wire multiplex loops are formed through transformers for the two-wire/four-wire conversion in the audio teleconferencing apparatus and it is necessary that neither oscillation nor singing be allowed to occur in any of the four-wire multiplex loops. That is, the amount of amplification depends on how much the loop gains of the four-wire multiplex loops are reduced. As a solution to this problem, there have been proposed a method using an echo canceller and a method called a level priority method.

The method using an echo canceller reduces the loop gains of the four-wire multiplex loops by cancelling sneak paths in the two-wire/four-wire conversion circuit of the audio teleconferencing apparatus by the use of the echo canceller. With this method, however, a sufficient amount of amplification cannot be obtained.

According to the level priority method, the electric power of voices of a plurality of speakers participating in the audio teleconference is compared and only the speaker's voice, of the maximum electric power is allowed to be heard by all participants but the other speakers' voices are blocked. This is a system that selectively switches speakers' voices according to their loudness. Since all four-wire loops are thus cut off, desired amplification can be achieved, but since switching control is effected on the basis of the electric power of voice, a particular speaker's voice is very likely to be switched ON according to the difference in loudness or circuit loss among speakers' voices; furthermore, this is a complete one-way system. Thus, the level priority method has a defect that communications are readily disrupted.

For example, in the case of the "chatting square," a plurality of conference rooms are prepared for individual topics and users send PB (DTMF: Dual Tone Multi-Frequency) signals during communication as they go into and out of the rooms; hence, the audio teleconferencing apparatus needs to receive the PB signals to implement the teleconferencing service. Hence, the audio teleconferencing apparatus calls for means which receives the PB signals during communication.

Conventionally, a PB receiver is provided for each channel to receive the PB signal during communication. With this method, however, the PB signal from another speaker sneaks in the two-wire/four-wire conversion circuit and is erroneously detected.

With the spread of the audio teleconferencing service intended for an unspecified number of people, such as the "chatting square," there have arisen problems of intentional interference with conversations among participants in the audio teleconference. This is very serious because intentional interference even by one of the participants would hinder conversations among the other participants and hence readily make it impossible to hold the audio teleconference. It is customary in the prior art to detect a disturbance or jamming sound on the basis of the loudness (or electric power) of the received signal; that is, the received signal is detected as a jamming sound when its electric power is large over a certain period of time. Yet, human conversations are intoned, and for instance, a shout or yell is large in sound volume but is not always a disturbance, whereas jamming sound is not necessarily large in sound volume; therefore, the conventional interference detecting method based on sound volume is erroneous and is not so high in the detection capability. Incidentally, intentional interference with the audio teleconference is usually made by continuously supplying a holding tone, music, noise or annoying sound into a telephone set connected to the audio teleconferencing apparatus.

SUMMARY OF THE INVENTION

It is a first object of the present invention to provide an audio teleconferencing apparatus which has a voice switch that permits any two-way conversations among more than two members without involving complete switching and prevents an insertion loss from increasing in the communication channel of a particular speaker and which permits sufficient amplification of speech signals.

A second object of the present invention is to provide an audio teleconferencing apparatus which includes, for each channel or telephone line, a PB receiver to prevent an erroneous detection of a PB signal that sneaks in the two-wire/four-wire conversion circuit from another speaker.

A third object of the present invention is to provide an audio teleconferencing apparatus which is equipped with an interference detector to ensure detection of a speaker who intentionally interferes with an audio teleconference.

To attain the first object, the audio teleconferencing apparatus of the present invention is characterized by the provision of voice detector means for detecting whether the received speech signal is voiced or unvoiced, receiving-speech variable loss insertion means for inserting a loss in the speech receiving path in the case of the unvoiced signal, and sending-speech variable loss insertion means for inserting a loss in the speech sending path in the case of the voiced signal, and in that a certain loss is inserted into any four-wire multiplex loops.

To attain the second object, the audio teleconferencing apparatus of the present invention is characterized by the provision of means for measuring the electric power of a sending speech signal, means for measuring the electric power of a received speech signal, and means for detecting the difference in electric power between the both signals to thereby prevent erroneous detection of a sneaking PB signal.

To attain the third object, the audio teleconferencing apparatus of the present invention is characterized by the provision of voice detector means for detecting the presence or absence of a voice in the received speech signal, means for obtaining the voice or speech activity factor on the basis of the presence or absence of the voice, and means for deciding the received speech signal as a disturbing sound when the above-mentioned factor exceeds a certain value.

The sending-speech variable loss insertion means, the receiving-speech variable loss insertion means and the voice detector are provided for each line interface circuit to control the loss of each loss insertion means according to the presence or absence of a voice and a certain loss is inserted into any four-wire multiplex loops to form a voice switch, by which it is possible to reduce the gain of the loops and hence increase amplification without seriously affecting the speech.

Since the minimum attenuation of the sneaking signal in the two-wire/four-wire conversion circuit is preknown, the maximum value of the electric power of the sneaking signal can be computed by measuring the electric power of the sending speech signal. By comparing a calculated value of the electric power of the sneaking signal and the electric power of the actual received signal, a check can be made to see if the received signal is a sneak path signal or a signal from a telephone line, and it is possible to prevent the PB receiver from malfunctioning by making the received signal invalid when it is found to be the sneak path signal.

The most marked difference between music which is often used as a disturbing sound and speeches is the sound activity factor (a ratio of the sound-active duration to a fixed period of time). The speech contains many silent intervals, for example, between words or phrases and when the speaker breathes. On the other hand, the music is played through utilization of mechanical vibration of musical instruments and the mechanical vibration is attenuated so slowly that the music has practically no silent intervals. By such interference or disturbance detection using the sound activity factor, it is possible to prevent an erroneous detection of a sneak-path PB signal, ensuring detection of interference or disturbance sounds.

BRIEF DESCRIPTION OF THE DRAWINGS

The present invention will be described in detail below with reference to the accompanying drawings, in which.

DESCRIPTION OF THE PREFERRED EMBODIMENTS

Figure 1:
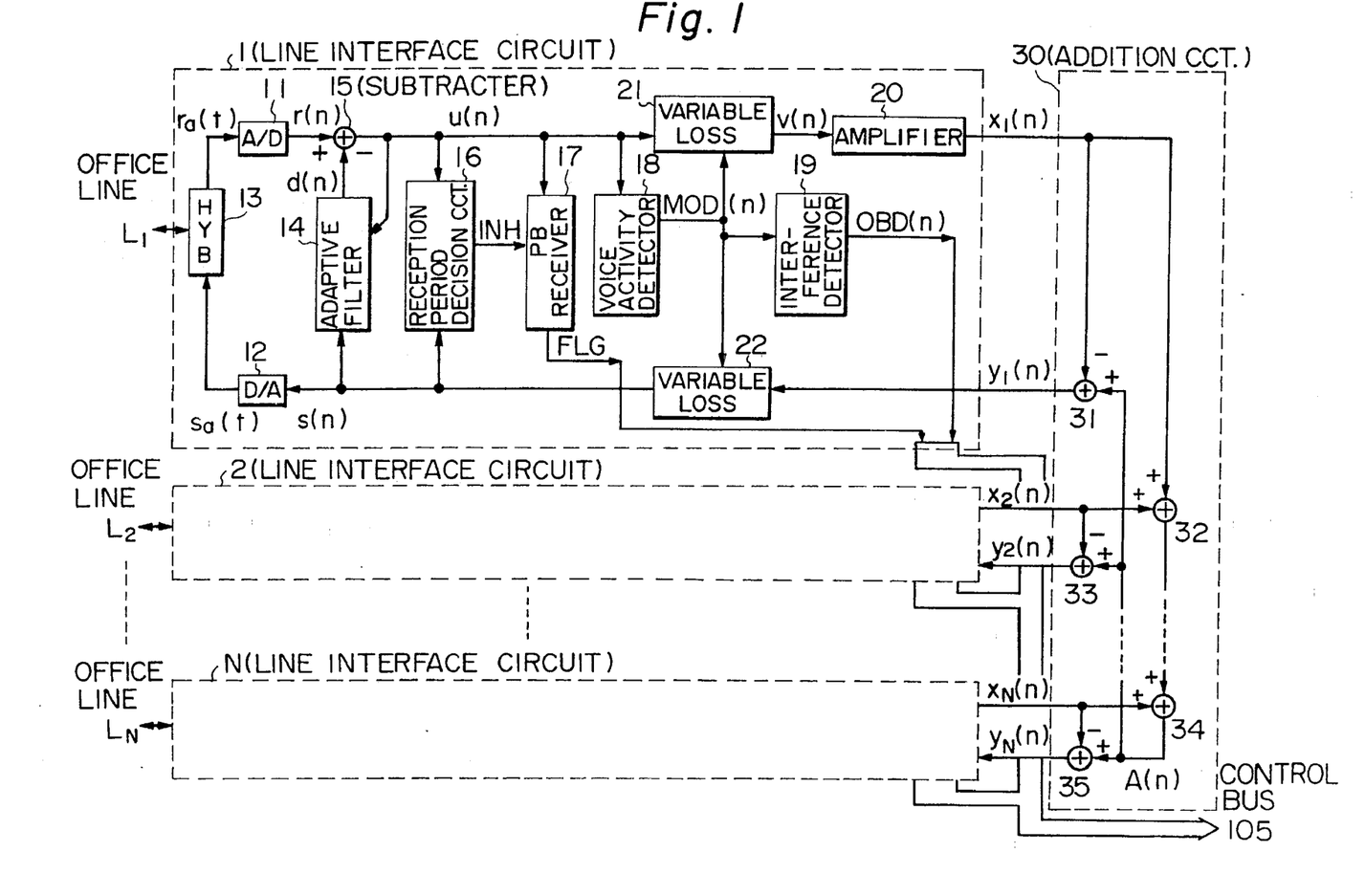
FIG. 1 is a block diagram illustrating an embodiment of the present invention.

FIG. 1 illustrates in block form the construction of the audio teleconferencing apparatus according to an embodiment of the present invention, which accommodates a plurality of lines $L_1$ through $L_N$ and comprises line interface circuits 1 through N each of which performs amplification, echo cancellation, voice switching, PB signal reception and interference detection for each line, an addition circuit 30 which is, employed for mutually interconnecting together the line interface circuits 1-N at their interconnection sides and adds and distributes voice or speech signals in the respective lines, control bus 105.

Since the line interface circuits 1 through N are all identical in construction, only the line interface circuit 1 will be described. In the line interface circuit 1, reference character A/D denotes an analog-to-digital (hereinafter referred to as A-D) converter 11, which converts an analog signal $r_a(t)$ to a digital signal $r(n)$; D/A denotes a digital-to-analog (hereinafter referred to as D-A) converter 12, which converts a digital signal $s(n)$ to an analog signal $5a(t)$; and HYB denotes two-wire/four-wire conversion (hybrid) circuit 13. In this example, since complete impedance matching with the line $L_1$ is impossible, the analog signal $r_a(t)$ contains a sneak-path component $s_a(n)$. An adaptive filter 14 and a subtracter 15 form an echo canceller. The adaptive filter 14 obtains a sneak-path characteristic (an impulse response) in the hybrid circuit 13 as a tap coefficient of a transversal filter (an adaptive operation) and inputs the digital signal $s(n)$ into the transversal filter, from which is provided an estimated value $d(n)$ of a sneak-path component of the signal $s(n)$ contained in the digital signal $r(n)$. The subtracter 15 subtracts the estimated value $d(n)$ from the digital signal $r(n)$ and provides an output $u(n)$. With such operations, a received speech signal (far-end speaker signal) component is retained intact in the subtracter output $u(n)$ and the sneak-path signal component of the signal $s(n)$ is suppressed. In practice, however, the sneak-path component still remains unremoved because of limitations on the number of taps, the adaptive operation and similar performance of the transversal filter in the adaptive filter 14. A reception period decision circuit 16 monitors the signals $s(n)$ and $u(n)$ and yields a signal INH which indicates whether the result of detection by a PB receiver 17 is valid or invalid. The PB receiver 17 is controlled by the signal INH. When the signal INH indicates "valid," the PB receiver 17 performs a PB signal detecting operation using the signal $u(n)$ as its input and provides the result of detection to the output FLG applied to the control bus 105, whereas when the signal INH indicates "invalid," the PB receiver 17 provides an output "no PB signal" to the output FLG regardless of the result of detection of the PB signal. A voice activity detector 18 receives the signal $u(n)$ as its input and makes a check to see if it contains the received signal (a speech, signal or the like) from the line $L_1$. When a sound is detected, the voice activity detector 18 provides a signal "voice active" to MOD(n), whereas when no sound is detected, the detector 18 provides a signal "voice non-active or silent" to MOD(n). A receiving speech variable loss means 21 and a sending speech variable loss means 22 form a voice switch. When the output MOD(n) indicates "voice active," the loss of the receiving speech variable loss means 21 is made 0 dB and the signal $u(n)$ is output intact as $v(n)$. On the other hand, the loss of the sending speech variable loss means 22 is made α dB and a signal $y_1(n)$ is attenuated by α dB and output as $s(n)$. When the signal MOD(n) indicates "voice non-active or silent," the loss of the receiving speech variable loss means 21 is made α dB and the signal u(n) is attenuated by α dB and output as v(n), and the loss of the sending speech variable loss means 22 is made 0 dB and the signal $y_1(n)$ is output intact as s(n). An interference detector 19 receives, as its input, the signal MOD(n) which is the result of detection of speech in the signal u(n), makes a check to see if the signal from the line $L_1$ is an interference sound and outputs the result of checking as OBD(n) applied to the control bus 105. An amplifier 20 amplifies the signal v(n) by β dB and outputs it as $x_1(n)$; that is, the amplifier 20 amplifies a voice or speech whose volume has been reduced by the transmission over the telephone line. Incidentally, β is set to a value which does not cause oscillation and singing in any of the four-wire loops of this audio teleconferencing apparatus and compensates for the circuit loss of the transmitted signal.

Figure 4:
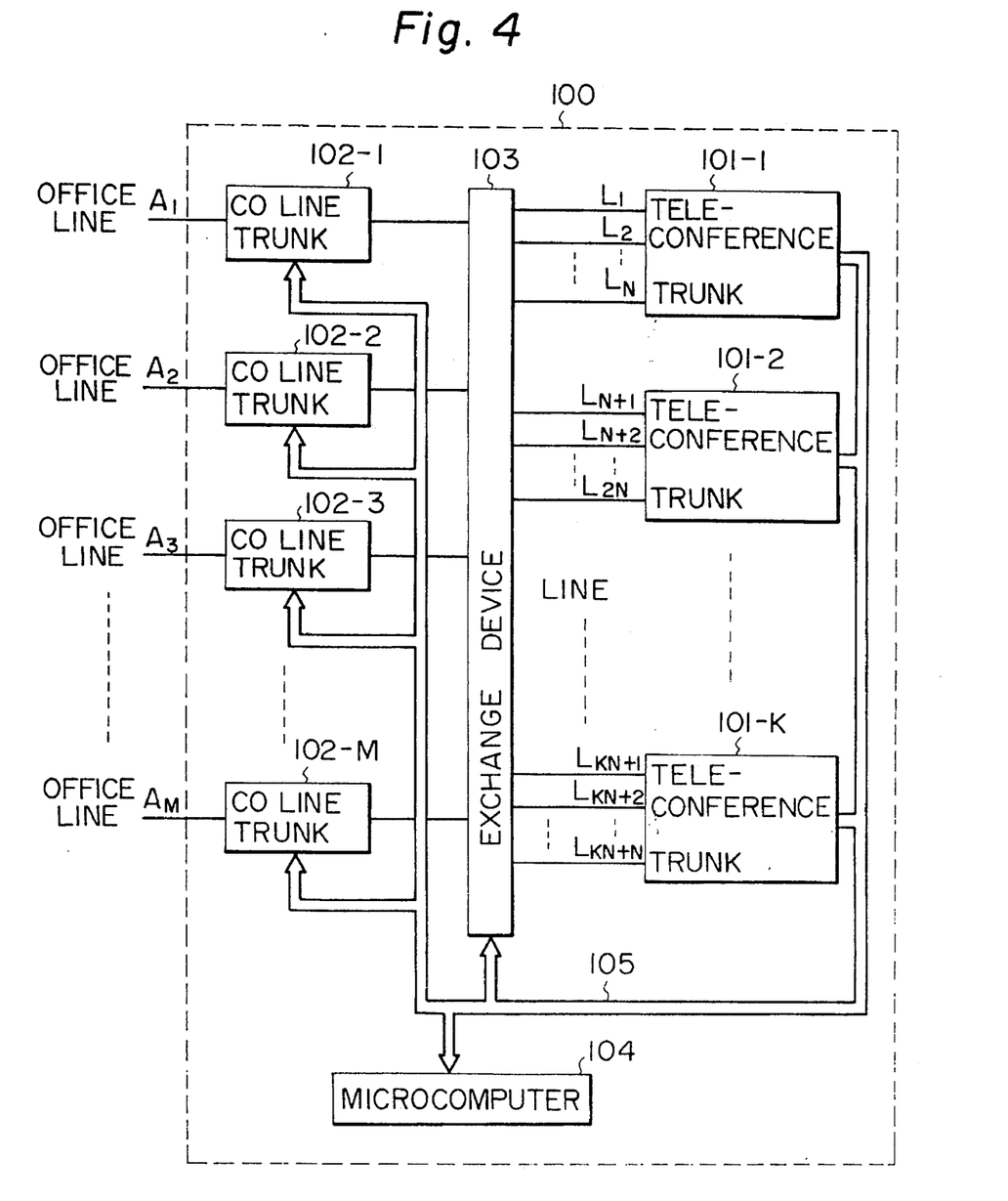
FIG. 4 is a block diagram illustrating another embodiment of the present invention.

In FIG. 1, the control bus 105 is provided to include the output FLG and the output OBD(n) for all the line interface circuits 1-N, as shown in FIG. 4, and will be described in detail below with reference to FIG. 4.

The addition circuit 30 is formed by pluralities of adders 32, 34 and subtracters 31, 33, 35 and adds together signals $x_1(n)$ through $x_n(n)$ of all speakers to obtain a signal A(n). A signal $y_k(n)$ to each speaker is obtained by subtracting a signal $x_k(n)$ from the signal A(n), and only an added value of the signals to other speakers appears in the signal $y_k(n)$.

With such a construction, a received speech signal from each telephone line is amplified and distributed via the addition circuit 30 to other lines. Thus, an audio teleconference is implemented.

Next, a description will be given of the operation of the voice switch.

The voice switch, which is formed by the receiving speech variable loss means 21 and the sending speech variable loss means 22, has two switching states: (1) a switching state (a receiving mode) wherein the receiving speech variable loss is 0 dB and the sending speech loss α dB when the signal u(n) is voice-active and the signal MOD(n) is "voice-active"; and (2) a switching state (sending mode) wherein the receiving speech variable loss is α dB and the sending speech variable loss 0 dB when the signal u(n) is voice-non-active or silent and the signal MOD(n) is "voice-non-active or silent."

First, communication between two arbitrary lines or channels will be described. Assume that speakers A and B are in communication with each other. When the both speakers are not in communication or do not speak (silent), voice switches of the both line interface circuits are in the "sending mode" and the loss α dB is inserted in the respective communication channel. When one of the speakers speaks and the other does not, the voice switch in the line interface circuit of the latter is in the "receiving mode" and the voice switch of the former in the "sending mode," and no loss is inserted in the communication channel from the former but a loss of 2α dB is inserted in the communication channel from the latter. When the both speakers speak, the voice switches in the both line interface circuits are in the "receiving mode" and the loss α dB is inserted in the both communication channels. Thus, in whatever state of communication, the loss of 2α dB is inserted by the voice switches are inserted in the four-wire loop formed in the communication channel between the two speakers.

Next, the influence of the voice switch on communication will be described.

The communication is mostly a half duplex communication, in which when the one speaker speaks, the other is silent. When the right to speak transfers from the one to the other speaker, there is usually a silent interval during which the both speakers are silent. When the both speakers are silent, the loss α dB is inserted in each communication channel, and when one of the speakers begins to speak, the losses in the communication channels change to 0 dB and 2α dB, respectively. When the both speakers become silent again, the loss α dB is inserted in the both communication channels. Thus, in the case where communications are mostly half duplex, the insertion loss in each communication channel varies essentially only α dB at the time of mode switching, although the voice switches are able to provide the 2α dB loss. Also in what is called a double talk state wherein a plurality of speakers speak at the same time, the loss in the both communication channels is only α dB, and hence the communication is not hindered.

The above description has been given of the operation of the voice switches in the case of communications between two particular or specified speakers. Also in an audio teleconferencing apparatus in which a voice switch is provided for each interface and losses in respective communication channels are controlled on the basis of the presence or absence of speech to thereby allow a plurality of conference participants to speak, the voice switches between two speakers operate in the same manner as described above. It is said that the loss of the voice switch which does not affect conversations is 5 dB or below. As described above, according to the present invention, the voice switches have a loss of 2α dB but produce an influence of essentially only α dB; therefore, α can be set to 5 dB.

Figure 2:
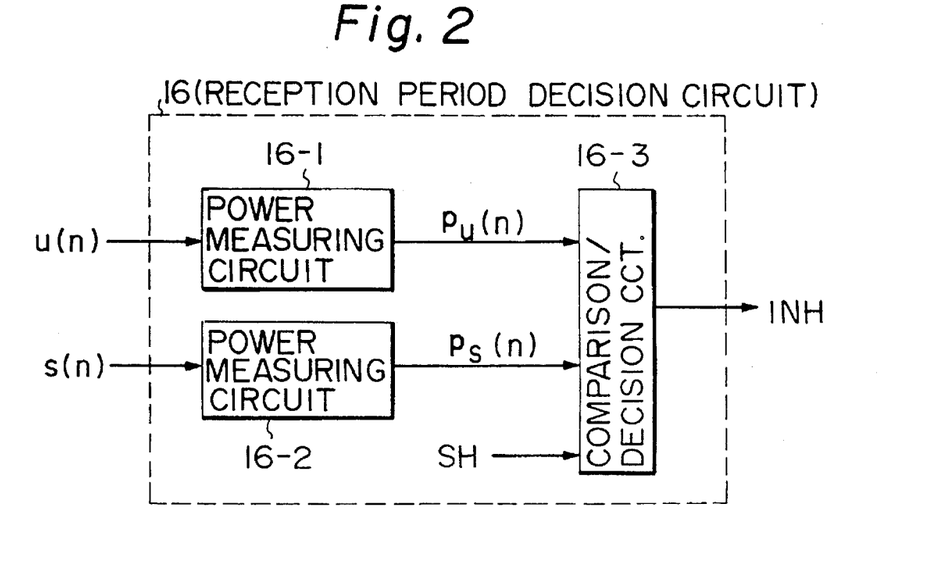
FIG. 2 is a block diagram showing an example of the construction of a PB reception period decision circuit for use in the present invention.

Referring next to FIG. 2, the construction of the PB signal receiving period decision circuit 16 will be described.

FIG. 2 illustrates in block form the construction of the PB signal reception period decision circuit 16, which comprises a power measuring circuit 16-1, another power measuring circuit 16-2 and a comparison/decision circuit 16-3. The power measuring circuit 16-1 calculates the electric power of the signal u(n) corresponding to a received speech signal and generates a signal $p_u(n)$.

$$[\text{When } u^2(n) \geq p_u(n-1):] \; p_u(n)=(1-\lambda_{u1})p_u(n-1)+\lambda_{u2}u^2(n) \; [\text{When } u^2(n) < p_u(n-1):] \; p_u(n)=(1-\lambda_{u2})p_u(n-1)+\lambda_{u2}u^2(n) \quad (1)$$

where $\lambda_{u1}$ is a coefficient relating to a time constant for the direction of increase in power and $\lambda_{u2}$ a coefficient relating to a time constant for the direction of decrease in power.

The power measuring circuit 16-2 calculates the electric power of the signal s(n) corresponding to a sending speech signal and generates a signal $p_s(n)$.

$$[\text{When } s^2(n) \geq p_s(n-1):] \; p_s(n)=(1-\lambda_{s1})p_s(n-1)+\lambda_{s1}s^2(n) \; [\text{When } s^2(n)<p_s(n-1):]p_s(n)=(1-\lambda_{s2})p_s(n-1)+\lambda_{s2}s^2(n) \quad (2)$$

where $\lambda_{s1}$ is a coefficient relating to a time constant for the direction of increase in power and As2 a coefficient relating to a time constant for the direction of decrease in power.

The comparison/decision circuit 16-3 inputs thereinto the outputs $p_u(n)$ and $p_s(n)$ and a signal SH and outputs the signal INH. Letting the sneak-path attenuation in the hybrid circuit 13 or echo canceller be represented by L (where 1>L>0), the signal SH has a value larger than L (a value with a margin adder to L). When $p_u(n) < p_s(n) \cdot SH$, the comparison/decision circuit 16-3 generates the INH signal "invalid" because the signal u(n) contains many sneak-path components of PS signals from other communication lines. When $p_u(n) > p_s(n) \cdot SH$, the signal u(n) contains many signal components from the communication line to which the decision circuit 16 belongs, and hence the circuit 16 generates the INH signal "valid."

Now, the operation of such a PB signal reception period decision circuit 16 will be described.

The PB receiver 17 is provided for each channel interface circuit and detects the PB signal therefrom. In practice, however, the PB receiver 17 may sometimes detect a PB signal from another line which has sneaked in the two-wire/four-wire conversion circuit and the echo canceller. Then the reception period decision circuit 16 makes a check to see if the signal u(n) is a signal received from the communication line $L_1$ to which the circuit 16 belongs or sneak-path signal s(n) from another line. In the case where the PB signal arrives from the communication line $L_1$ and the signal s(n) is voice-non-active or silent, $p_u(n) > p_s(n) \cdot SH$ and the decision circuit 16 provides the INH signal "valid," then the PB receiver 17 receives the PB signal from the communication line $L_1$. In a case where a signal received from the line $L_1$ is silent and the signal s(n) from another line is a PB signal, $pu(n) < p_s(n) \cdot SH$ because $p_u(n)$ is the power of the sneak-path signal s(n), and the decision circuit 16 provides the INH signal "invalid," forcing the PB receiver 17 to produce an output "no signal" to prevent an erroneous detection of the PB signal from another line. In a case where PB signals arrive from the line L1 and another, if $p_u(n) > p_s(n) \cdot SH$, the decision circuit 16 outputs the INH signal "valid," causing the PB receiver 17 to perform the PB signal detection. In this instance, since the signal u(n) contains plenty of power of the PB signal from the line $L_1$, the PB receiver 17 can detect it. In a case where $p_u(n) < p_s(n) \cdot SH$, the decision circuit 16 outputs the INH signal "invalid," causing the PB receiver 17 to provide the output FLG of "no signal." This is because the signal u(n) contains plenty of PB signal components in another line. In general, however, the power of the received signal from the line $L_1$ in the signal u(n) is larger than the power of the sneak-path signal s(n) from another line, the PB signal can be correctly detected in such a case.

Now, a description will be given of the timing relation between the PB receiver 171 and the reception period decision circuit 16. If a PB signal from another communication line is mixed with the signal s(n), it is delayed and attenuated in the hybrid circuit and the echo canceller and sneaks in the signal u(n), then it is erroneously detected by the PB receiver 17. To avoid this, it is necessary that the reception period decision circuit 16 makes the INH signal "invalid" prior to the erroneous detection by the PB receiver 17 and keeps the signal "invalid" until the erroneous detection is completed.

The relationships of the coefficients $\lambda_{u1}$, $\lambda_{u2}$, $\lambda_{s1}$, and $\lambda_{s2}$ which are used to satisfy the above-decribed detection characteristic will be described. At first, a definition of a time delay or lag in each circuit will be given.

Let the detection time by the PB receiver 17 be represented by $\tau_{p1}$, a trailing edge delay time (the period from the time when the signal u(n) becomes silent to the time the PB receiver output goes "no signal") by $\tau_{p2}$, a delay time by a sneak path in each of the hybrid circuit and the echo canceller by $\tau_H$, a time delay of the power measurement using the time constant $\lambda_{u1}$ by $\tau_{u1}$, a time delay of the power measurement using the time constant $\lambda_{u2}$ by $\tau_{u2}$, a time delay of the power measurement using the coefficient $\lambda_{s1}$ by $\tau_{s1}$ and a time delay of the power measurement using the coefficient $\lambda_{s2}$ by $\tau_{s2}$. Incidentally, $\lambda$ and $\tau$ are in inverse proportion to each other.

To make the INH signal "invalid" prior to the erroneous detection by the PB receiver 17, it is necessary that the PB reception period decision circuit 16 detects the sneak-path phenomenon earlier than a time when the PB receiver 17 detects it and that $\tau_{u1} \leq \tau_{p1}$ and $\tau_{s1} \leq \tau_H + \tau_{p1}$. Moreover, in order to surely make the INH signal "invalid" in connection with the transient response of the power measurement, too, it is necessary that the signal $P_s(n)$ follow the power earlier than does the signal $p_u(n)$ so that $\tau_{s1} \leq \tau_H + \tau_{u1}$. In this embodiment, the times $\tau_{p1}$ and $\tau_H$ are set to 30 mS and 0 mS, respectively, and the coefficients $\lambda_{u1}$ and $\lambda_1$ are chosen such that the delay times $\tau_{u1}$ and $\tau_{s1}$ become 2 mS and 2 mS, respectively.

To keep the INH signal "invalid" until the end of the erroneous detection by the PB receiver 17, it is necessary that the PB reception period decision circuit 16 detects the phenomenon of the signal s(n) becoming silent later than does the PB receiver 17 and that $\tau_{s2} \leq \tau_H + \tau_{p2}$. Moreover, in order to surely make the INH signal "invalid" in connection with the transient response of the power measurement, too, it is necessary that the signal $P_s(n)$ follow the power later than does the signal $p_u(n)$ so that $\tau_{s2} \geq \tau_H + \tau_{u2}$. In this embodiment, the times $\tau_{p2}$ and $\tau_H$ are set to 30 mS and 10 mS, respectively, and the coefficients $\lambda_{u2}$ and $\lambda_{s2}$ are chosen such that the delay times $\tau_{u2}$ and $\tau_{s2}$ become 2 mS and 50 mS, respectively.

By operating the PB reception period decision circuit 16 as described above, it is possible to prevent an erroneous detection of the PB signal from another communication line. Even if PB signals arrive from the communication line $L_1$ and another one, the PB signal from the communication line $L_1$ can be correctly be received since $p_u(n) < p_s(n) \cdot SH$ in this case. Furthermore, since the PB signal reception period decision circuit 16 operates independently for each line interface, PB signals, even if arriving from a plurality of lines at the same time, can all be detected correctly.

Figure 3:
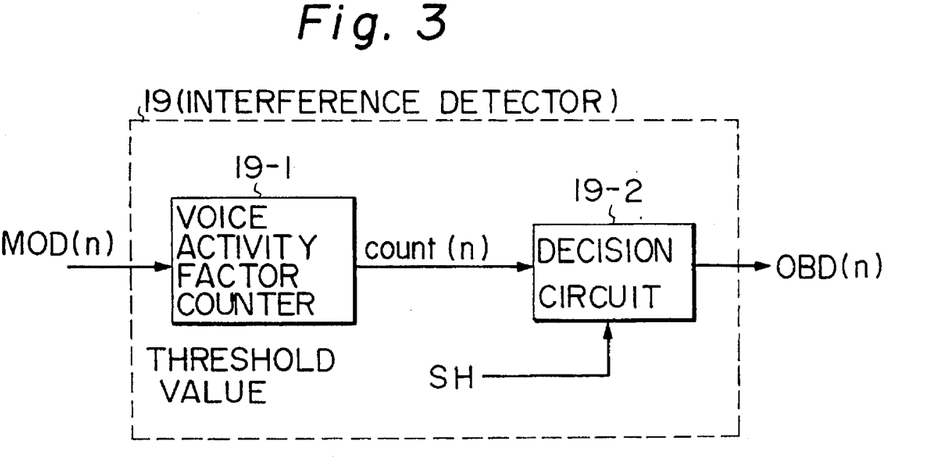
FIG. 3 is a block diagram showing an example of a disturbance sound detector for use in the present invention.

Turning next to FIG. 3, the construction of the interference detector 19 will be described.

FIG. 3 illustrates in block form the construction of an example of the interference detector 19, which is formed by a voice or speech activity factor counter 19-1 and a decision circuit 19-2.

The voice activity detector output MOD(n) indicates voice activity or inactivity in the signal u(n), and hence represents voice activity or inactivity in the received speech signal from the communication line $L_1$ to which the interference detector 19 belongs. The voice activity factor counter 19-1 inputs thereinto the signal MOD(n) and outputs its count value as count(n). The counter 19-1 is formed by a counter which is able to count from 0 to N, and it counts up by "1" when the signal MOD(n) is "voice active" and goes down by "k" counts when the signal MOD(n) is "voice non-active." When the count value of the counter 19-1 exceeds N, it is forced to be N and when the count value becomes smaller than zero, it is forced to be zero.

A description will be given of the operation of the voice activity factor counter 19-1. When the ratio of voice activity to non-activity is k:1, the counter 19-1 is in equilibrium and its count value remains near a certain value. For example, when the threshold value is set to a voice activity factor of 90%, the value of the above-said k counts is set to 9. In this instance, the counter 19-1 continues to count upward for a signal whose voice activity factor is in excess of 90%, and hence the count value remains near N; whereas for a signal of a voice activity below 90% the counter 19-1 continues to go downward, and hence the count value remains near 0. Thus, the voice activity factor counter 16-1 indirectly compares a predetermined voice activity factor with the voice activity factor of the input signal.

The decision circuit 19-2 receives a threshold value SH and the counter output count(n), decides the presence or absence of an interference sound and provides the result of decision as an output OBD(n). Incidentally, a hysteresis is provided to prevent the result of decision from fluctuation. That is, in a case where N>SH and OBD(n−1) is "no interference," the counter output count (n) and N are compared with each other. When the former is equal to the latter, the decision circuit 19-2 generates its output OBD(n) "interference detected," and when the former is smaller than the latter, the circuit 19-2 generates its output OBD(n) "no interference." Furthermore, in a case where OBD(n−1) is "interference detected," the decision circuit 19-2 compares the counter output count(n) with the threshold value SH. If the former is smaller than the latter, the output OBD(n) "interference detected" is provided, and if the former is equal to or smaller than the latter, the output OBD(n) "no interference" is provided.

Next, the values SH and N will be described.

Now, let it be assumed that the signal MOD(n) is "voice non-active or silent." The output signal count(n) is zero in this case. When the signal MOD(n) is "voice active," the voice activity factor counter 19-1 is incremented by "1" whenever supplied with the signal MOD(n) and generates the signal count(n) "interference detected" upon N-th reception of the signal MOD(n) "voice active." This circuit operates at time intervals T, and hence requires a detection time of N·T seconds. In other words, the detection time is dependent on the value N. By setting N to an extremely small value, even a voice could be detected; hence, in this embodiment a value N·T is set to 8 sec to prevent an erroneous detection of voice. When the signal MOD(n) goes "voice non-active," the voice activity factor counter 19-1 is decremented by k counts whenever supplied with the signal MOD(n) and generates the output count(n) "no interference" upon (N−SH)/k-th reception of the signal MOD(n). That is, the threshold value SH determines the non-detection time. In this embodiment, (N−SH)·T/k is set to 0.5 sec.

Turning next to FIG. 4, the audio teleconferencing apparatus according to the present invention will be described as being applied to an exchange.

FIG. 4 shows an exchange 100 and a plurality of office lines $A_1$ through $A_M$. The exchange 100 is formed, as an office line interface, by: central office line trunks 102-1, 102-2, 102-3 ... 102-M; audio teleconference trunks 101-1, 101-2 ... 101-k; an exchange device 103 switching between the office lines $A_1$ through $A_M$ and the audio teleconference trunks 101-1 through 101-k; a microcomputer 104 which controls the operation of the exchange 100; and a control bus 105.

The central office line trunks 102-1 through 102-M interface with the office lines $A_1$ through $A_M$ and each have a DC closed circuit and a reception detector. The reception detector provides the result of detection to the microcomputer 104 via the control bus 105, and the DC closed circuit is controlled by the microcomputer 104 via the control bus 105. The exchange device 103 is controlled by the microcomputer 104 via the control bus 105 to perform switching between the office lines $A_1$ through $A_M$ and the audio teleconference trunks 101-1 through 101-k (telephone lines $L_1$ through $L_{KN+N}$), forming a commu-nication channel of the audio teleconference. The audio teleconference trunks 101-1 through 101-k are exactly identical in construction with the line interface circuit 1 shown in FIG. 1. In this embodiment, however, the output FLG from the PB receiver 17 and the output OBD(n) from the interference detector 19 are applied via the control bus 105 to the microcomputer 104. The microcomputer 104 controls the operation of the exchange 100 via the control bus 105.

Concrete operations of this embodiment will be described in connection with a terminating type audio teleconferencing service intended for use by unspecified people. In the terminating type audio teleconferencing service, the plurality of audio teleconference trunks 101-1 through 101-k are each prepared for one of topics of conversation. For example, the audio teleconference trunk 101-1 is assigned to an audio teleconference on no particular topics, the teleconference trunk 101-2 is a teleconference on a topic of hobby and the teleconference trunk 101-k is a teleconference on topics of sports.

When the office line $A_1$ is called, the central office line trunk 102-1 detects the call by the call detector and indicates it to the microcomputer 104 via the control bus 105. The microcomputer 104 instructs the central office line trunk 102-1 to respond to the call and instructs the exchange apparatus 103 to connect the office line $A_1$ to the telephone circuit $L_1$ in accordance with the topic of conversation (the audio teleconference on no particular topics, in this case). In this way, the office line $A_1$ is connected to the audio teleconference trunk 101-1 to allow the caller to participate in the teleconference. The same is true of other office lines. By such an operation of the exchange as mentioned above, a conference room is provided for each topic of conversation to implement a terminating type audio teleconferencing service intended for unspecified people.

Next, a description will be given of an operation by which a speaker (or office line) transfers from one to another audio teleconference room. To implement this function, respective topics (audio teleconference trunks 101-1, 101-2, 101-k) are preassigned numbers; for example, the audio teleconference trunk 101-1 is "1", the teleconference trunk 101-2 is "2" and the teleconference trunk 101-k is "k". In a case where the speaker on the office line $A_1$ now connected to the telephone line $L_1$ via the exchange device 103 desires to transfer to another audio teleconference on topics of hobbies, for example, the speaker PB dials "2" during the communication operation. The teleconference trunk 101-1 receives the PB signal on the telephone line $L_1$ by the PB receiver 17 and applies the signal FLG to the microcomputer 104 via the control bus 105. The microcomputer 104 instructs the exchange 103 to connect the office line $A_1$ to the telephone line $L_{N+1}$ (the audio teleconference trunk 101-2). In this way, a speaker on any office line is allowed to transfer from one to another audio teleconference room through the use of the PB signal.

Next, a description will be given of operations of this embodiment when the audio teleconference is hampered by intentional interference. In a case where the speaker on the office line $A_1$ intentionally interferes when the office line $A_1$ is being connected to the telephone line $L_1$ via the exchange device 103, the interference tone on the line $L_1$ is detected by the interference detector 19 of the audio teleconference trunk 101-1 and the signal OBD(n) is applied via the control bus 105 to the microcomputer 104. The microcomputer 104 instructs the exchange device 103 to disconnect the office line $A_1$ from the line $L_1$ and instructs the central office line trunk 102-1 to open (or cut off) the DC closed circuit, thus disconnecting the office line $A_1$ from the audio teleconferencing service. In this way, if the interference tone is detected, the corresponding office line is forced off to eliminate interference with audio teleconferences, implementing smooth audio teleconferencing service.

Figure 5:
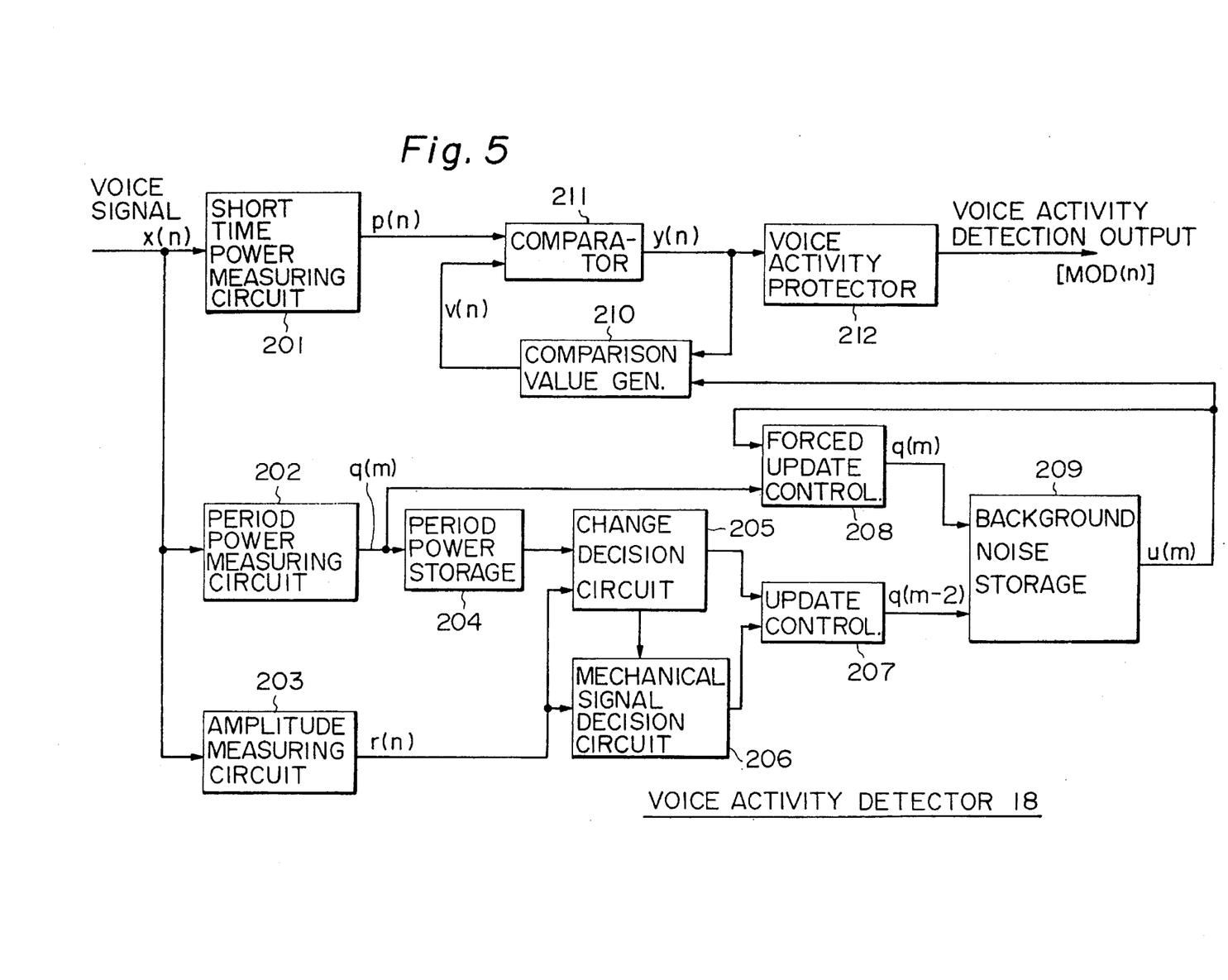
FIG. 5 is a block diagram showing an example of a voice activity detector for use in the present invention.

Next, a specific operative example of the voice activity detector 18 for use in the present invention will be described.

FIG. 5 illustrates in block form the construction of the voice activity detector 18.

Figure 6:
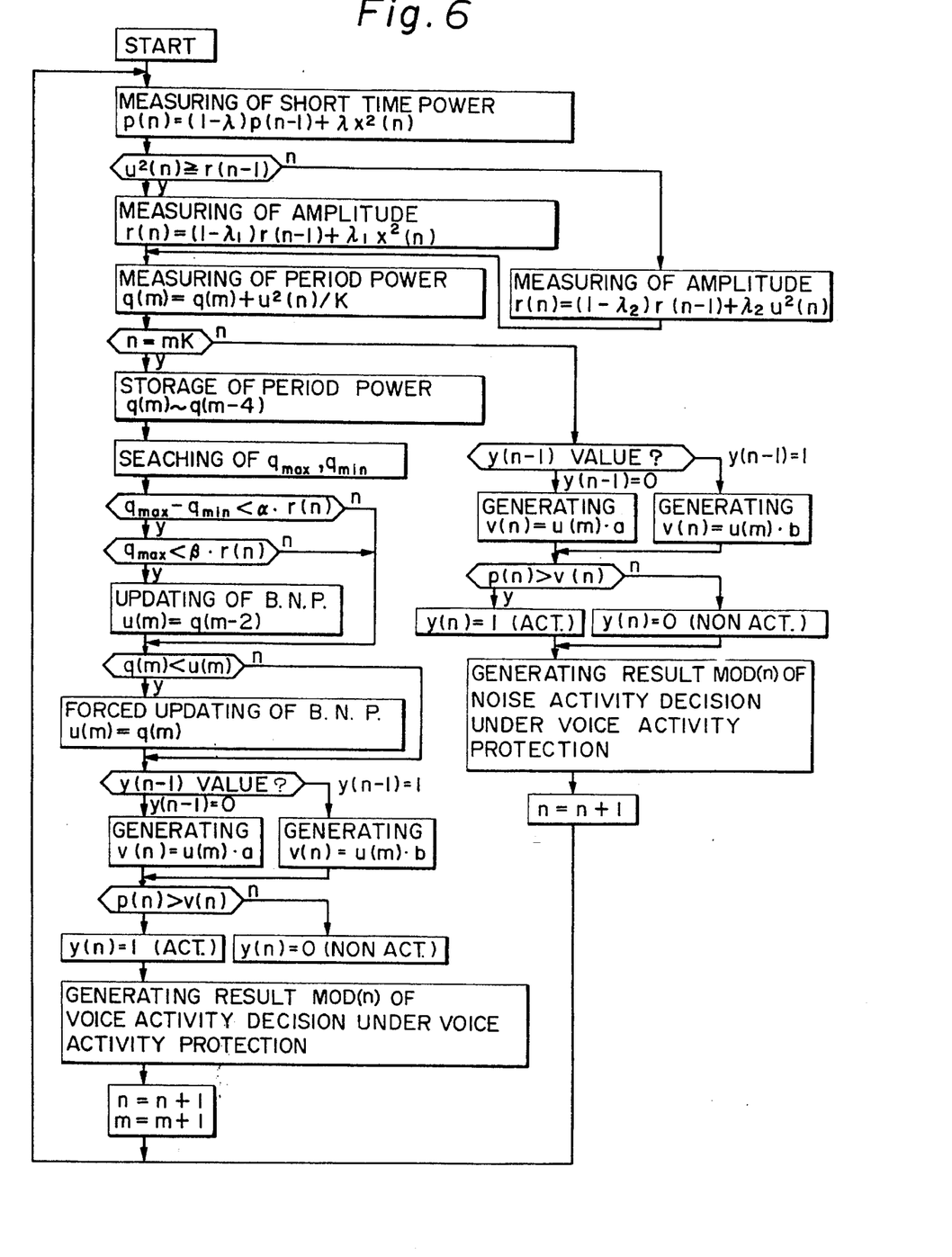
FIG. 6 is a flowchart explanatory of the operation of the voice activity detector depicted in FIG. 5.

The operation of the voice activity detector 18 will be described with reference to FIG. 6. A short time power measuring circuit 201 is to measure the electric power of the received speech signal u(n) through the use of Eq. (3) for instance.

$$p(n)=(1-\lambda)p(n-1)+\lambda u^2(n) \qquad (3)$$

where p(n) is the power in a time n, $\lambda$ is a coefficient relating to a time constant and x(n) is the amplitude value of the voice signal in the time n. In this example, the time constant is set to 5 ms.

A period power measuring circuit 202 measures the power of the received speech signal u(n) for certain periods of time, for example, as given by the following equation (4):

$$a(m) = \sum_{i=0}^{K-1} u^2(i)/K \qquad (4)$$

where q(m) is the power in an m-th period, K is the length of the period and u(i) is the amplitude value of the voice signal at a time (m−1)K+i. In this example, the length of the period or section is set to 80 ms.

An amplitude measuring circuit 203 employed as "amplitude variation detection means is to measure the amplitude variation of a voice signal included in the received speech signal by the following equation (5), for instance:

$$[\text{When } u^2(n) \geq r(n-1):] r(n)=(1-\lambda_1)r(n-1)+\lambda_1 u^2(n) [\text{When } u^2(n)<r r(n-1)+\lambda_2 u^2(n) \qquad (5)$$

where r(n) is the amplitude value at a time n, $\lambda_1$ is a coefficient relating to a time constant for the direction of an increase in the amplitude value, $\lambda_2$ is a coefficient relating to a time constant for the direction of a decrease in the amplitude value and u(n) is the amplitude value of the voice signal at the time n. The coefficients are set so that $\lambda_1$ is larger than $\lambda_2$ and the amplitude measuring circuit 203 is caused to follow the amplitude in its increasing direction more quickly than in the decreasing direction so that the peak value of the voice signal included in the received speech signal is obtained. In this example, the time constant for the amplitude increasing direction is set to 1 ms and the time constant for the amplitude decreasing direction is 1 second.

A period power storage 204 stores M outputs q(m), q(m−1), . . . , q(m+1) from the period power measuring circuit 202. In this example, M is set to 5.

A change decision circuit 205 obtains maximum and minimum values of all the power values stored in the period power storage 204 and, when the following equation (6) is satisfied, it decides that no variation is detected, that is, that the measurement of background noise is possible.

$$q_{max}-q_{min}<\alpha r(n) \qquad (6)$$

where $q_{max}$ is the maximum value, $q_{min}$ is the minimum value, $\alpha$ is a proportional constant and r(n) is the amplitude value expressed by Eq. (5). The proportional constant $\alpha$ (where $\alpha<1$) is a coefficient for estimating a power change in a voice non-active period on the basis of the peak value of the voice signal included in the received speech signal, and this coefficient depends on the ratio of the speaker's voice to noise including voices around the speaker. Hence, this coefficient $\alpha$ should also be changed in accordance with the speaker's environment, but in practice, it is experimentally determined on the basis of the ratio of the maximum presumed noise level to the speaker's voice.

A mechanical signal decision circuit 206 is to eliminate a signal which has little difference in the period power and hence satisfies Eq. (6) but is so high in power that is would hinders the detection of voice activity if it is used as the background noise. This circuit allows the measurement of background noise when Eq. (7) is satisfied.

$$q_{max}<\beta r(n) \qquad (7)$$

where $q_{max}$ is the above-mentioned maximum value and $\beta$ (where $\beta<1$) is a quantity which is obtained in relation to the signal included in the received speech signal to noise ratio of the voice signal.

An update controller 207 selects a representative one of the values stored in the period power storage 204 and updates a stored value u(m) in a background noise storage 209 described later when the change decision circuit 205 and the mechanical signal decision circuit 206 both which are jointly employed as "background noise detecting means" decides that the measurement of background noise is possible. When M is an odd number, a center value q(m−(M−1)/2 in the period power storage 204 is used as the representative value for such reason as given below. Even in a case of satisfying Eq. (6), the preceding period power value q(m−M+i) is very likely to be a power value including the talkspurt ending of the voice signal and the period power value q(m) to be updated is very likely to be a power value including the talkspurt starting; hence, the both values have levels higher than the true background noise level and should not be selected. The afore-mentioned coefficient $\alpha$ cannot strictly be set and is loosely set; therefore, even if the power value contains the talkspurt starting and ending, it is decided as being change-free. The reason for which M is set to 5 and the stored value q(m−2) is used as the representative value in this example is to select, as the representative value, the period sufficiently remote from the talkspurt start and end.

A forced update controller 208 is means which causes the background noise level (i.e., background noise power: B.N.P) to follow storage values of the background noise storage 209 when the background noise level rapidly drops. When the background noise level is on the decrease, the optimum value for update is the latest and minimum section power q(m). However, the stored value of the background noise storage 209 which is updated by the update controller 207 is the center value q(m−(M−1)/2) which is older than the power value q(m). In such an instance, the background noise level is so high that there is the possibility of missing of talkspurt starting. To avoid this, the latest section power value q(m) is forced to be updated by unconditionally setting u(m)=q(m) when it is smaller than the stored value in the background noise storage 209. By constructing the forced update controller 208 to perform updating after updating by the update controller 207, the both update controllers 207 and 208 are allowed to operate independently of each other. Another function of the forced update controller 208 is to initialize the stored value of the background noise storage 209. That is, initial storage values of the period power storage 204 and the background noise storage 209 are set higher than an expected background noise level at the start of operation of the voice activity detector so that the actual background noise level could rapidly followed by operating the forced update controller 208.

The update controller 207, the forced update controller 208, the background noise storage 209 and the comparison value generator 210 are jointly employed as "threshold value means" for determining a threshold value corresponding to the background noise power as mentioned below.

The background noise storage 209 is one that stores the storage value u(m) which is updated by the update controller 207 and the forced update controller 208.

A comparison value generator 210 is a circuit which uses the stored value u(m) to generate a comparison value v(n) in accordance with an output y(n−1) from a comparator 211 described later on.

$$[\text{When } y(n-1)=0{:}]v(n)=u(m)\cdot a \quad [\text{When } y(n-1)=1{:}]v(n)=u(m)\cdot b \quad (8)$$

where a is a coefficient for raising the background noise level so that a voice signal of low level by a breath or the like is not detected as "voice active," and b is a coefficient for deriving the amplitude peak value of the background noise from the value u(m). Incidentally, since the comparator 211 apparently has a hysteresis characteristic by setting a<b, the output y(n) will not chatter near the background noise level, and hence the speaker will not have a feeling of unnaturalness.

The comparator 211 employed as "decision means" compares the output p(n) from the short time power measuring part 201 with the output v(n) from the comparison value generator 210 and outputs y(n)=1 (voice active) when p(n)<v(n) and y(n)=0 (voice non-active) when p(n)≦v(n).

A voice activity protector 212 protects the voice activity detector output MOD(m) from a change by a short-time voice non-activity in the voice active period. Once the comparator 211 produces the output y(n)=1, the voice activity protector 212 holds its output MOD(M) to be "voice active" until after the elapse of the minimum protective time, regardless of the value of the output y(n).

As will be seen from the above, the detected background noise level is made to approach the actual value at substantially the same time as the start of operation of the voice activity detector 18, and when it rises, it is updated by the update controller 207, and when it drops, it is updated by the forced update controller 208. Hence, even if the background noise changes, it is possible to detect an excellent background noise level. Since the voice activity is detected only by comparison between the voice signal power and the background noise level corresponding to the voice non-active signal level, no delay occurs in the detection of voice activity except the time for measurement of power by the short-time power measuring circuit 201. An allowable delay in the detection of voice activity for preventing the missing of talkspurt start from being perceived is set to 6 ms or below, and no difficulties will be met through the use of such time constants as mentioned above. While the above embodiment has been described on the assumption that discrete time sample values are processed, it is evident that such sample values may also be processed as a continuous signal by the use of an analog circuit.

Figure 7:
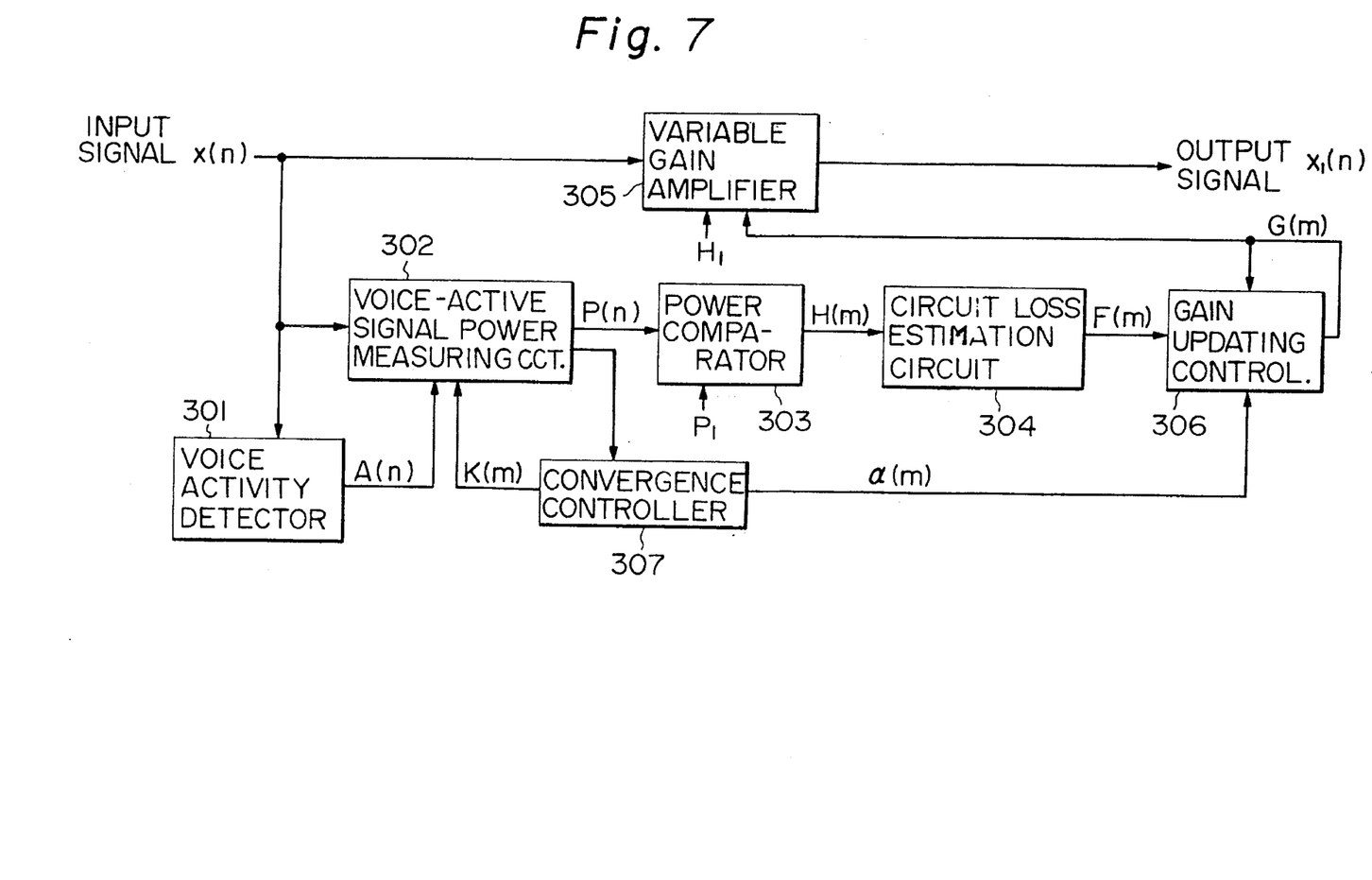
FIG. 7 is a block diagram showing an example of a variable loss for use in the present invention.
Figure 8:
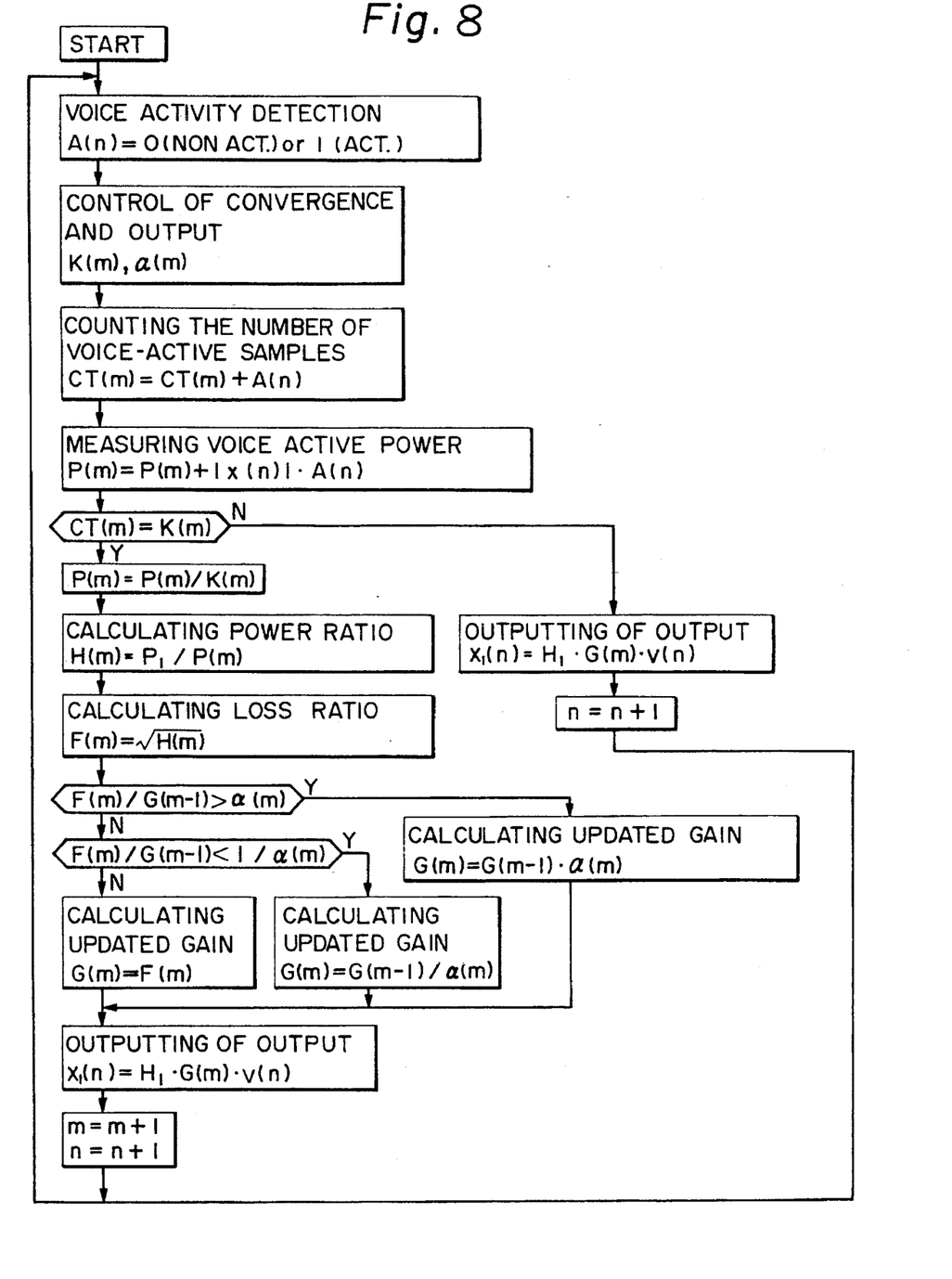
FIG. 8 is a flowchart explanatory of the operation of the circuit shown in FIG. 7.

FIG. 7 illustrates in block form an example of the construction of the present invention and FIG. 8 is a flowchart showing the operation of this embodiment. A voice activity detector 301 (corresponding to the voice activity detector 18 in FIG. 1) detects voice activity in the signal v(n) and produces an output signal A(n)=1 if voice active and A(n)=0 if voice non-active.

A voice-active signal power measuring circuit 302 measures, by the following equation (12), the power (voice-active signal power) of a voice active sample of the received speech signal u(n) (when A(n)=1).

$$P(m) = \frac{1}{K(m)} \Sigma |v(n)| \cdot A(n) \quad (9)$$

where m is the measurement number, P(m) is the m-th measured voice-active signal power and K(m) is the number of voice-active samples to be summed up in the m-th measurement. Now, the measurement by Eq. (9) will be described in detail. The number of voice-active samples is counted like CT(m)←CT(m)+A(n) (where the symbol←indicates substitution). The count thus obtained is added to P(m)←P(m)+|v(n)|·A(n) to measure the power of the voice-active samples. Such operations are continued until CT(m)=K(m), and when CT(m)=K(m) is reached, P(m)←P(m)/K(m) is set to obtain the average power. In this way, the voice-active signal power measuring circuit 302 does not measure a voice-non-active sample (the input signal v(n) when A(n)=0) and obtains the average of the absolute values of the K(m) voice-active samples, thereby measuring the power of the voice-active signal.

A power comparator 303 calculates the ratio of the power P(m) to the reference power $P_1$ on the basis of the following equation (10):

$$H(m) = \frac{P_1}{P(m)} \quad (10)$$

In the above, the reference power $P_1$ is voice-active signal power of the input signal v(n) measured when a speaker speaks with an average sound volume and the voice suffers an average circuit loss, and the power ratio H(m) is a value which indicates a deviation of the voice-active signal power P(m) from the reference power $P_1$.

A circuit loss estimation circuit 304 calculates the ratio of an average circuit loss to the actual circuit loss and generates an output F(m). The power ratio H(m) contains a circuit loss difference (the loss ratio of the average circuit loss to the actual circuit loss) and a voice power difference between individual speakers (the power ratio of average voice power to the actual voice power). If multiplied by H(m) times, the power of the signal v(n) will become equal to the reference power $P_1$, but this will remove the voice power difference between individual speakers and intonations of conversations, resulting in the conversations becoming unnatural. To avoid this, the circuit loss estimation circuit 304 obtains the circuit loss difference as a loss ratio from the power ratio H(m) to determine the gain of a variable gain amplifier 305 in accordance with the circuit loss.

If the range $L_1$ dB of distribution of the difference in voice power among individual speakers and the range $L_1$ dB of variation of the circuit loss are known, it is possible to predetermine an influence ratio according to the both ranges and to compute the influence by the circuit loss from the power ratio H(m). That is, the influence by the circuit loss on the power ratio H(m) is assumed to be $L_2/(L_1+L_2)$ and the loss ratio F(m) is obtained using the following equation (11):

$$F(m) = s\sqrt{H(m)} \quad (11)$$

where $s=(L_1+L_2)/L_2$. Since it is said that $L_1=20$ dB and $L_2=24$ dB, s=2 in this embodiment. That is, since the values $L_1$ and $L_2$ are substantially equal to each other, one half of the power ratio H(m) is regarded as being influenced by the circuit power difference and the other half as being influenced by the voice power difference and s is set to 2.

A gain updating controller 306 outputs, as a gain update value G(m), the quantity of amplification which compensates for the difference between the actual circuit loss and the average circuit loss. In this case, if the loss ratio F(m) is output as the gain update value G(m), the gain will undergo a substantial change every measurements. To avoid this, the gain updating value is limited and the gain update value G(m) is output on the basis of the following equation (12):

$$\left[\text{When } \frac{F(m)}{G(m-1)} > \alpha(m):\right]$$

$$G(m) = \alpha(n) \cdot G(m-1)$$

$$\left[\text{When } \frac{1}{\alpha(m)} \leq \frac{F(m)}{G(m-1)} \leq \alpha(m):\right] \quad (12)$$

$$G(m) = F(m)$$

$$\left[\text{When } \frac{F(m)}{G(m-1)} < \frac{1}{\alpha(m)}:\right]$$

$$G(m) = \frac{1}{\alpha(m)} G(m-1)$$

In the above, am (where $1 \leq \alpha(m)$) is a gain update limit value for each updating, and the gain update value $G(m)$ is selected to be $\alpha(m)$ times smaller but $1/\alpha(m)$ times larger than the previous gain update value $G(m-1)$ to thereby prevent the gain update value $G(m)$ from undergoing a substantial change.

A variable gain amplifier 305 amplifies the input signal $v(n)$ on the basis of the following equation (16) and provides an output $x_1(n)$.

$$x_1(n) = H_1 \cdot G(m) \cdot v(n) \quad (13)$$

where $H_1$ is a reference amplification value, which is set to a value which compensates for the average circuit loss. Thus, the gain is made to have the value $H_1 \cdot G(m)$ and the difference between the average circuit loss and the actual circuit loss is compensated for by the gain update value $G(m)$, whereby the output signal $x_1(n)$ is made to have an optimum sound volume at all times.

A convergence controller 307 outputs the number of voice-active samples $K(m)$ to be added up in an m-th operation and the gain update limit value $\alpha(m)$ to quickly converge the gain in the early stage of communication and control the gain convergence and variation characteristics in such a manner as to keep the gain stable thereafter. Incidentally, the above-said values are selected from preset constants in accordance with the value m.

Next, a description will be given of the relationships between the values $K(m)$ and $\alpha(m)$ and the gain of the variable gain amplifier 305.

The value $K(m)$ is a coefficient relating to the period for measuring the power of the voice-active signal and is indicative of the number of voice-active samples of the input signal $v(n)$ which is used for the power measurement. Hence, the larger the value $K(m)$ is, the less the measured value scatters and the more accurately the power of the voice-active signal is obtainable. In this instance, however, the measuring time becomes longer and the time interval between respective updating of the gain update value $G(m)$ increases, retarding the convergence of the gain.

Since $\alpha(m)$ is the gain update limit value for each updating, an increase in this value will speed up the convergence of the gain but will cause an increase in the change of the gain. Thus, when it is desirable to reduce the gain variation (high stability), the value $K(m)$ is made large and the value $\alpha(m)$ small. When it is desirable to speed up the convergence of the gain (high convergence characteristic), the value $K(m)$ is made small and the value $\alpha(m)$ large.

In the early stage of the start of communication, the gain needs to be quickly converged. During the communication operation the gain variation musts be held small and accurate. These requirements can be met by holding the value $K(m)$ small and the value $\alpha(m)$ large at the early stage of communication and then by gradually increasing the value $K(m)$ and decreasing the value $\alpha(m)$ with the lapse of time.

In this embodiment, letting the n sampling period be represented by T and assuming that m is made equal to 1 at the start of communication, $$\left.\begin{array}{ll} K(m \cdot T) = 500 \text{ mS} & (\text{when } m = 1) \\ K(m \cdot T) = 1 \text{ S} & (\text{when } m = 2 \text{ to } 7) \\ K(m \cdot T) = 2 \text{ S} & (\text{when } m = 8 \text{ or more}) \end{array}\right\} \quad (14)$$

$$\left.\begin{array}{ll} \alpha(m) = 3.98 \text{ (12 dB)} & (\text{when } m = 1) \\ \alpha(m) = 1.12 \text{ (1 dB)} & (\text{when 2 to 7}) \\ \alpha(m) = 1.02 \text{ (0.2 dB)} & (\text{when } m = 8 \text{ or more}) \end{array}\right\} \quad (15)$$

To quickly converge the gain immediately after the start of communication (when m=1), the power of the voice active signal during 500 mS is measured and the gain is updated within a range of ±12 dB. Next, when m=2 to 7, the power of the voice-active signal during 1 s is measured and the gain is updated within a range of ±1 dB, whereby a deviation of the gain updated when m=1 is corrected to a correct convergence value. When m=8 or more, the gain has already converged, the power of the voice-active signal during 2 S is measured and the gain is updated within a range of ±0.2 dB. Since it is said that humans cannot perceive gain variants within a range of 0.3 dB, the value 0.2 dB is selected in this embodiment.

As will be seen from the above, the deviation of the power of the voice active component of the received speech signal $v(n)$ from the reference power $P_1$ can be detected by measuring the former and obtaining the ratio between them. By calculating the influence of the circuit loss on this deviation and compensating it in the variable gain amplifier 305, it is possible to obtain an optimum sound volume independent of the circuit loss. Moreover, in case of updating the gain of the variable gain amplifier 305, the measurement period in the voice-active signal power measuring circuit 302 and the update limit value in the gain updating controller 306 are set and these values are changed with the lapse of time to control the convergence characteristic and variations of the gain, by which speakers are allowed to enjoy conversations with the optimum sound volume without being aware of variations in the power of their voices.

As will be appreciated from the above, according to the first aspect of the invention, the voice switch is provided for each interface circuit and the circuit loss is controlled on the basis of the presence or absence of a voice from the corresponding telephone circuit. By this, it is possible to obtain the highly excellent advantages listed below and hence further increase the amplification in the audio teleconferencing apparatus α dB.

(1) The voice switch correctly operates independently of the communication level in each circuit.

(2) Although the voice switch is a 2α dB switch, a change of only α dB is caused at the time of switching.

(3) In the audio teleconference wherein a plurality of speakers hold conversations, the operations of voice switches between all pairs of speakers are dependent on the state of communication between the two speakers.

According to the second aspect of the invention, the use of the PB receiving period decision circuit prevents an erroneous detection of PB signals from other circuits and permits simultaneous detection of PB signals from other circuits.

According to the third aspect of the invention, the interference detection utilizing the voice activity factor ensures the detection of interference such as music, without erroneous detection of voices of conversations.

What we claim is:

1. An audio teleconferencing apparatus comprising:

more than two line interface circuits each connected at its line side to a communication line; and an addition circuit provided for mutually interconnecting together said more than two line interface circuits at their interconnection sides;

each of said line interface circuits comprising:

line connection means connected to said communication line at said line side for receiving a speech signal from said communication line;

voice activity detection means connected to said line connection means for detecting the voice activity of the speech signal received;

receiving-speech variable loss means connected to said line connection means for attenuating said received speech signal by a predetermined value when it is detected by said voice activity detection means that said received speech signal is voice non-active;

sending-speech variable loss means connected between said interconnection side and said line connection means for attenuating a sending-speech signal applied from said interconnection side by a predetermined value when it is detected by said voice activity detection means that said received speech signal is voice active; and amplification means inserted between said variable loss means and said interconnection side for amplifying said received speech signal attenuated by said received-speech variable loss means, by a predetermined value.

2. An audio teleconferencing apparatus according to claim 1, each of said line interface circuits further comprising:

DTMF detection means for detecting a DTMF signal in said received signal;

means for measuring the electric power of said received speech signal; and

DTMF receiving period decision means for deciding that the result of the detection of said DTMF signal is valid when the ratio of the power of said received speech signal to the power of said sending speech signal is larger than a predetermined threshold value.

3. An audio teleconferencing apparatus according to claim 1 or 2, each of said line interface circuits further comprising:

means for obtaining a voice activity factor of said received speech signal from a result of detection of the voice activity of said received speech signal by said voice activity detection means; and means for deciding the presence of interference when said voice activity factor is larger than a predetermined threshold value.

4. An audio teleconferencing apparatus according to claim 1, wherein said voice activity detection means includes:

amplitude variation detection means for detecting amplitude variations of the received speech signal;

power measurement means for measuring the electric power of said received speech signal;

background noise detection means for detecting, as background noise power, the electric power of said received speech signal in a period during which the amplitude variation detected by said amplitude variation means is small;

threshold value means for determining a threshold value corresponding to said background noise power; and decision means for deciding the presence of the voice activity when the power of said received speech signal is larger than said threshold value.

5. An audio teleconferencing apparatus according to claim 4, wherein said background noise detection means includes means for updating, as background noise power, the power of said received speech signal smaller than said background noise power already obtained.

6. An audio teleconferencing apparatus according to claim 4, wherein said background noise detection means includes protection means whereby a signal small in amplitude variation but large in power is prevented from becoming background noise.

7. An audio teleconferencing apparatus according to claim 4, for detecting the voice activity in a four-wire output from a two-wire/four-wire conversion circuit, each of said line interface circuits further comprising:

means for measuring the input electric power of a four-wire input signal;

means for measure the output electric power of a four-wire output signal;

erroneous detection preventing means for deciding that an output from said voice activity detection means is valid when the ratio of said input power is larger than a predetermined constant.

8. An audio teleconferencing apparatus according to claim 1, wherein said receiving-speech variable loss means includes:

voice activity detection means for detecting a voice-active period in which an input signal is voice-active;

voice-active signal power measuring means for measuring the electric power of said received speech signal in said voice-active period;

power comparison means for obtaining the power ratio of the power of said received speech signal to a predetermined reference power;

circuit loss estimation means for obtaining from said power ratio the loss ratio of a circuit loss to an average circuit loss value; and variable gain amplification means for amplifying the received speech signal with a gain corresponding to the product of said loss ratio and a predetermined amplification value.

9. An audio teleconferencing apparatus according to claim 8, wherein said receiving-speech variable loss means further includes:

convergence control means whereby a measurement time of said voice active signal power measuring means and a gain update limit value of said variable amplification means are varied with the lapse of time from the start of communication, thereby to quickly converge the gain of said variable amplification means at the early stage of communication immediately after is start and to hold said gain to be stable during said communication operation.

* * * * *